No. 679,791. Patented Aug. 6, 1901.
F. C. STÖCKEL.
BRAKE CONTROLLING APPARATUS.
(Application filed Feb. 2, 1901.)

(No Model.) 3 Sheets—Sheet 2.

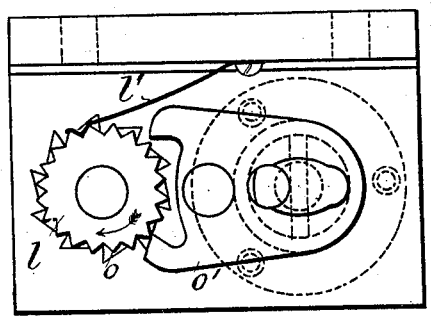
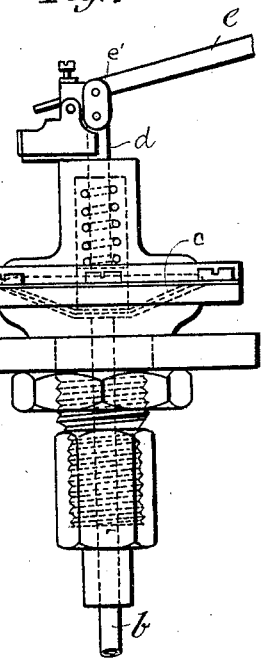
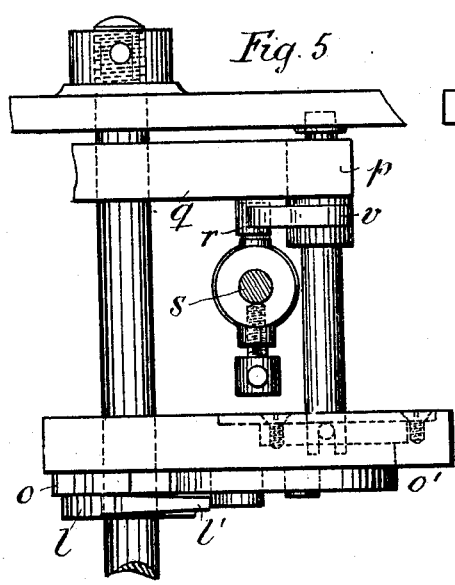
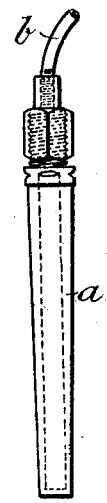
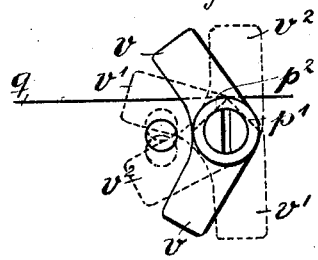

UNITED STATES PATENT OFFICE.

FRANTS CHRISTIAN STÖCKEL, OF COPENHAGEN, DENMARK.

BRAKE-CONTROLLING APPARATUS.

SPECIFICATION forming part of Letters Patent No. 679,791, dated August 6, 1901.

Application filed February 2, 1901. Serial No. 45,778. (No model.)

*To all whom it may concern:*

Be it known that I, FRANTS CHRISTIAN STÖCKEL, of Copenhagen, Denmark, have invented a new and useful Improvement in Brake-Action Recorders, which invention is fully set forth in the following specification.

This invention relates to means for obtaining a diagram to show the intensity of the working of brakes or at the same time the duration as well as the intensity, and thereby the length of the traveling, at any moment. The construction is adapted for use in all cases where brake-blocks are used, but is of particular use in determining the working of railway-brakes.

The accompanying drawings show one arrangement of an apparatus such as may be applied for railway-brakes.

Figure 1:
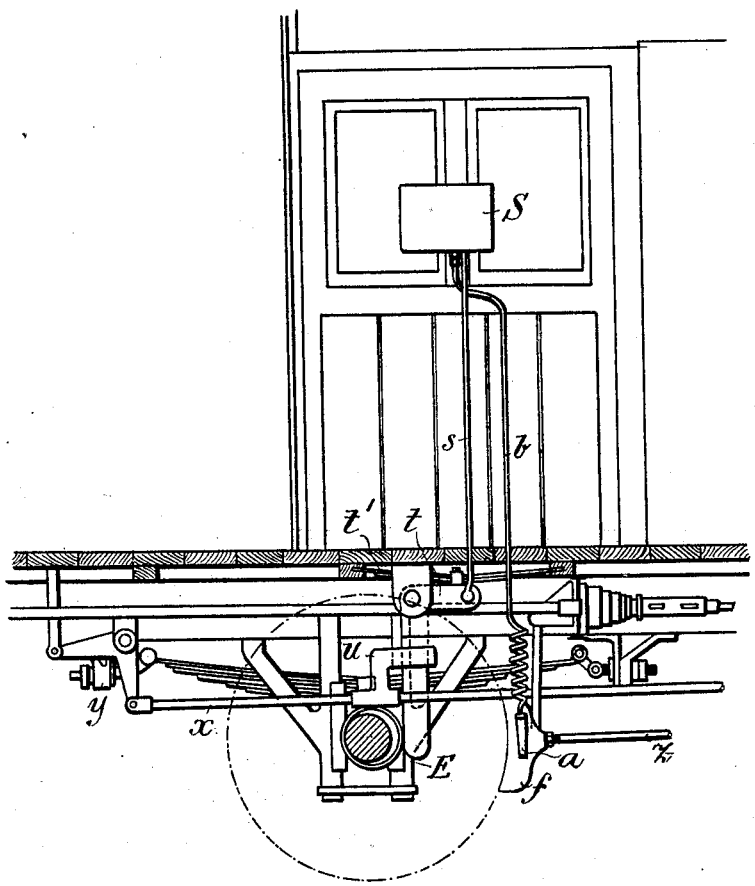
Figure 2:
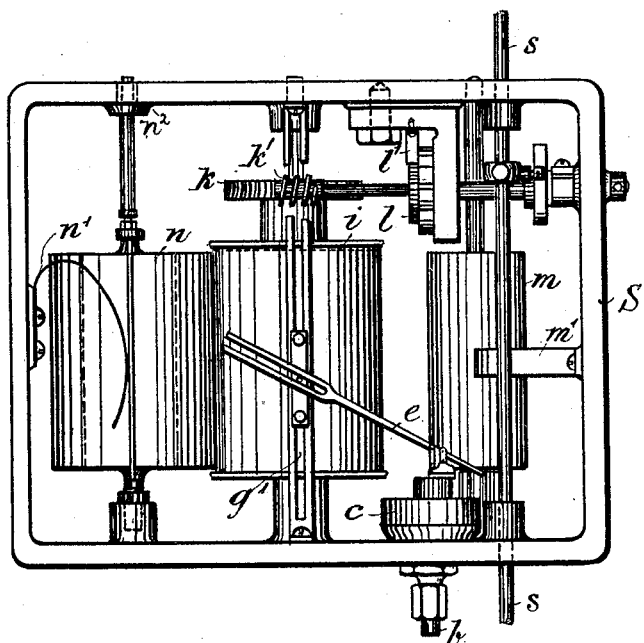

Figure 1 shows the brake as attached to the vehicle, the floor of the latter being shown in section. Fig. 2 is a side view, and Fig. 3 a top view, of the controlling apparatus; Figs. 4 and 5, side and top views, respectively, of a detail of the mechanism; Fig. 6, a detail of the turning-iron, and Figs. 7 and 8 show part of the diaphragm and receptacle.

The brake-block $f$ is applied in any ordinary manner through the elbow-lever $y$, pivoted below the body of the vehicle, the rod $x$, and the transverse journal with crank connections, (not shown,) all this being an ordinary construction. Below the body of the vehicle is pivoted an elbow-lever $t$, to the short horizontal arm of which is pivoted an upright rod $s$, while the longer arm depends in close juxtaposition to the axle, being normally held away from the axle by the fork $u$, carried on rod $x$. Upon the vehicle-axle is an eccentric E, from which the long arm of the lever $t$ is normally held by the fork $u$; but when the brake is applied by drawing the rod $x$ forward a spring $t'$ forces the lever strongly against the eccentric. Thereupon at each revolution of the wheel the eccentric E oscillates the lever $t$, and consequently causes the vertical rod $s$ to reciprocate. This reciprocation of rod $s$ operates the recording-drum, &c., within the frame S in a manner to be described.

Figure 3:
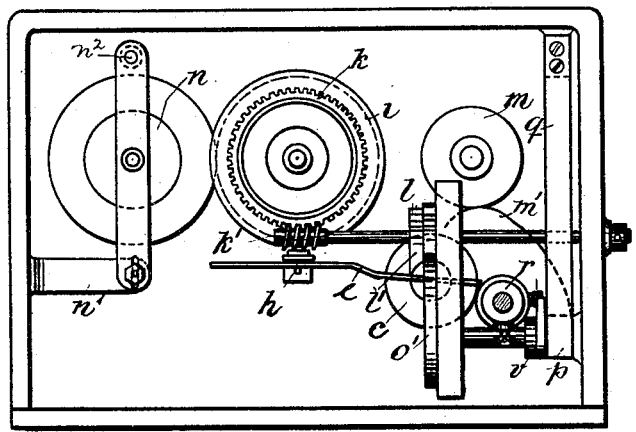

In the frame S, Figs. 2 and 3, $i$ is a drum or roller carrying the pinion $k$, in mesh with which is the worm $k'$ on a suitable journal. On a journal parallel therewith is a turning-iron $v$, Fig. 6, having two flattened faces on its hub at $p'$ and $p^2$. A flat spring $q$ coöperates with these flattened surfaces and forces the turning-iron to assume one of its two extreme positions, (indicated by the dotted lines $v'$ and $v^2$ of Fig. 6.) A tappet $r$ on the rod $s$ moves the turning-iron $v$ backward and forward, the presence of spring $q$ determining the extent of the angular movement without regard to the length of stroke of rod $s$. This alternating movement of the turning-iron is communicated by its shaft to the anchor $o'$, which, with the coöperation of a pawl, as spring $l'$, turns the ratchet $l\,o$ upon the shaft of worm-screw $k'$. Thus the revolution of the vehicle-axle oscillates the lever $t$ backward and forward, which reciprocates the rod $s$ vertically, which oscillates the turning-iron $v$, that causes the escapement $o'\,l'\,o$ $l$ to turn the worm $k$ and rotate the drum $i$. The drum $n$ is mounted in bearings pivoted at $n^2$, the drum $n$ parallel to drum $i$ being held closely against drum $i$ by the spring $n'$. A third drum $m$ carries a roll of diagram-paper, which is passed across drum $i$ and secured to drum $n$, so that the rotation of drum $i$ by its friction turns drum $n$ and unwinding the paper from drum $m$ draws it across the face of drum $i$. A spring $m'$ holds the paper taut. A stylus or tracing point $j$, pressed upon the paper by a light spring, would trace a horizontal line thereon as the paper is drawn beneath it.

A receptacle $a$ is located in the brake-block $f$ in close proximity to its friction-surface. The receptacle is connected to a tube $b$, the lower portion of which is shown with a number of coils to produce a spring in order that the brake may be readily detached without interfering with the mechanism above. The upper end of tube $b$ communicates with a flaring enlargement, upon which is secured a diaphragm $c$. A vertical rod $d$ is carried by this diaphragm and operates to raise the lever $e$, pivoted at $e'$. The outer end of lever $e$ is a fork that straddles a pin $h$ upon the slide $g$, the latter moving vertically in the slideway $g'$, which is adjacent and parallel to drum $i$. A lightly spring pressed stylus-point $j$ is carried on the side of this slide to record on the paper as it is drawn over the adjacent portion of drum $i$. A suitable liquid is in the receptacle $a$ and the tube $b$. When the brake is applied and the fork $u$ withdrawn and the reciprocation of the rod $s$ is serving to operate the mechanism in frame S, the stylus proceeds to trace a horizontal line upon the diagram-paper. As the heat created by the friction of the brake commences to act the liquid inclosed in the receptacle $a$ and its tube $b$ becomes expanded, and thereby acts upon the diaphragm $c$ to thrust the rod $d$ upward and accordingly elevate the outer end of lever $e$. As a consequence when the brake first begins to act the line traced is, as already stated, a horizontal one, but then begins to mount upward on a curve, going the higher the harder the brake is worked. When the working ceases, the drum will stop and the paper will be stationary; but the liquid will cool slowly, so that a vertical descending line closes the diagram. By inspection of the diagram the length of the line traced will show the duration of the working, and thereby the distance traveled with brakes applied, while the height of the line above the normal will indicate the amount of heat caused by the friction, and consequently the relative amount of friction—that is, the intensity of the working. In other words, the diagram will be a measure for the work done, and by the information so obtained the attendant can intelligently control the working of his brakes. If a diagram of the intensity alone is wished for, all the mechanical parts above described may be removed except the receptacle $a$, tube $b$, diaphragm $c$, and its parts and a spring employed to turn the drum to draw the paper forward.

The foregoing description sets forth one embodiment of my invention; but I do not limit myself to the precise details of construction therein set forth, and the invention may be embodied in other ways.

What I claim as my invention is—

1. The combination with a brake-block, of a receptacle located therein to contain a suitable liquid, and an indicating device actuated by the heat expansion of said liquid to record upon a diagram the intensity of the working.

2. The combination of a brake-block, a receptacle located therein, a tube connected therewith and closed by a diaphragm, said receptacle and tube filled with a suitable liquid, a lever carried by said diaphragm, and an indicator upon said lever for tracing upon diagram-paper a diagram of the intensity of the working.

3. In a vehicle, a drum for carrying diagram-paper, and a reciprocating device actuated by the revolution of the vehicle-axle when its brake is applied, said device operating by an escapement to revolve said drum and draw the diagram-paper under a suitable indicator to record the amount of the work done.

4. In a vehicle, a drum for carrying diagram-paper, a reciprocating device actuated by the revolution of the vehicle-axle when its brake is applied, said device operating by an escapement to revolve said drum and draw the diagram-paper under a suitable indicator, and a device actuated by the heat produced by the friction of the brake to move said indicator, whereby is recorded both the amount and the intensity of the work done.

In testimony whereof I have signed this specification in the presence of two subscribing witnesses.

FRANTS CHRISTIAN STÖCKEL.

Witnesses:
J. W. V. BRAMMER,
S. CHRISTENSEN.